(12) United States Patent
Singh et al.

(10) Patent No.: US 8,285,974 B2
(45) Date of Patent: *Oct. 9, 2012

(54) AGE MATRIX FOR QUEUE ENTRIES DISPATCH ORDER

(75) Inventors: Gaurav Singh, Los Altos, CA (US); Srivatsan Srinivasan, San Jose, CA (US); Lintsung Wong, Santa Clara, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 792 days.

This patent is subject to a terminal disclaimer.

(21) Appl. No.: 11/830,727

(22) Filed: Jul. 30, 2007

(65) Prior Publication Data

US 2008/0320478 A1    Dec. 25, 2008

Related U.S. Application Data

(63) Continuation of application No. 11/820,350, filed on Jun. 19, 2007.

(51) Int. Cl.
*G06F 9/30* (2006.01)

(52) U.S. Cl. ...................................... 712/214

(58) Field of Classification Search ......................... None
See application file for complete search history.

(56) References Cited

U.S. PATENT DOCUMENTS

| | | | |
|---|---|---|---|
| 5,933,627 A | 8/1999 | Parady | |
| 6,065,105 A * | 5/2000 | Zaidi et al. | 712/23 |
| 6,237,079 B1 | 5/2001 | Stoney | |
| 6,324,640 B1 * | 11/2001 | Le et al. | 712/217 |
| 6,334,182 B2 * | 12/2001 | Merchant et al. | 712/214 |
| 6,721,874 B1 | 4/2004 | Le et al. | |
| 6,732,242 B2 * | 5/2004 | Hill et al. | 711/158 |
| 6,785,802 B1 * | 8/2004 | Roy | 712/216 |
| 7,266,675 B2 | 9/2007 | Burky et al. | |
| 2003/0093509 A1 | 5/2003 | Li et al. | |
| 2004/0243743 A1 | 12/2004 | Smith | |
| 2006/0184738 A1 | 8/2006 | Bridges et al. | |
| 2008/0320016 A1 | 12/2008 | Singh et al. | 712/214 |

(Continued)

FOREIGN PATENT DOCUMENTS

WO    2009088396    7/2009

OTHER PUBLICATIONS

Weiss, Mark. "Data Structures & Algoritm Analysis in C++". Addison-Wesley, Second Edition, 1999. pp. 110-115.*

(Continued)

*Primary Examiner* — Robert Fennema

(74) *Attorney, Agent, or Firm* — Sterne, Kessler, Goldstein & Fox PLLC

(57) ABSTRACT

An apparatus for queue allocation. An embodiment of the apparatus includes a dispatch order data structure, a bit vector, and a queue controller. The dispatch order data structure corresponds to a queue. The dispatch order data structure stores a plurality of dispatch indicators associated with a plurality of pairs of entries of the queue to indicate a write order of the entries in the queue. The bit vector stores a plurality of mask values corresponding to the dispatch indicators of the dispatch order data structure. The queue controller interfaces with the queue and the dispatch order data structure. The queue controller excludes at least some of the entries from a queue operation based on the mask values of the bit vector.

33 Claims, 6 Drawing Sheets

U.S. PATENT DOCUMENTS

2008/0320274 A1    12/2008   Singh et al. .................. 712/214

OTHER PUBLICATIONS

Non-Final Office Action dated Sep. 21, 2009 for U.S. Appl. No. 11/820,350.
Foldoc: "Flip Flop" and "LRU" articles, Nov. 11, 1995 and Feb. 15, 1995 respectively, http://foldoc.org.
International Search Report and Written Opinion for PCT Application No. PCT/US08/07723 mailed on Jul. 31, 2009.
Non-Final Office Action dated Feb. 5, 2010 for U.S. Appl. No. 11/847,170.
Final Office Action dated Apr. 29, 2010 for U.S. Appl. No. 11/820,350.
Miller, "Cache Memory: The Key to High Performance Personal Computers", Jan. 1992.
Non-Final Office Action dated Sep. 14, 2010 for U.S. Appl. No. 11/820,350.
Final Office Action dated Jan. 20, 2011 for U.S. Appl. No. 11/820,350.
Final Office Action dated Feb. 7, 2011 for U.S. Appl. No. 11/847,170.
Non-Final Office Action dated Oct. 24, 2011 for U.S. Appl. No. 11/847,170.
Non-Final Office Action dated Sep. 14, 2011 for U.S. Appl. No. 11/820,350.

* cited by examiner

AGE MATRIX FOR QUEUE ENTRIES DISPATCH ORDER

BACKGROUND

An instruction scheduling queue is used to store instructions prior to execution. There are many different ways to manage the dispatch order, or age, of instructions in an instruction scheduling queue. A common queue implementation uses a first-in-first-out (FIFO) data structure. In this implementation, instruction dispatches arrive at the tail, or end, of the FIFO data structure. A look-up mechanism finds the first instruction ready for issue from the head, or start, of the FIFO data structure.

In conventional out-of-order implementations instructions are selected from anywhere in the FIFO data structure. This creates "holes" in the FIFO data structure at the locations of the selected instructions. To maintain absolute ordering of instruction dispatches in the FIFO data structure (e.g., for fairness), all of the remaining instructions after the selected instructions are shifted forward in the FIFO, and the data structure is collapsed to form a contiguous chain of instructions. Shifting and collapsing the remaining queue entries in this manner allows new entries to be added to the tail, or end, of the FIFO data structure. However, with a robust out-of-order issue rate, several instructions are shifted and collapsed every cycle. Hence, maintaining a contiguous sequence of queue entries without "holes" consumes a significant amount of power and processing resources.

SUMMARY

Embodiments of an apparatus are described. In one embodiment, the apparatus is an apparatus for queue allocation. An embodiment of the apparatus includes a dispatch order data structure, a bit vector, and a queue controller. The dispatch order data structure corresponds to a queue. The dispatch order data structure stores a plurality of dispatch indicators associated with a plurality of pairs of entries of the queue to indicate a write order of the entries in the queue. The bit vector stores a plurality of mask values corresponding to the dispatch indicators of the dispatch order data structure. The queue controller interfaces with the queue and the dispatch order data structure. The queue controller excludes at least some of the entries from a queue operation based on the mask values of the bit vector. Other embodiments of the apparatus are also described.

Embodiments of a method are also described. In one embodiment, the method is a method for managing a dispatch order of queue entries in a queue. An embodiment of the method includes storing a plurality of dispatch indicators corresponding to pairs of entries in a queue. Each dispatch indicator is indicative of the dispatch order of the corresponding pair of entries. The method also includes storing a bit vector comprising a plurality of mask values corresponding to the dispatch indicators of the dispatch order data structure. The method also includes performing a queue operation on a subset of the entries in the queue. The subset excludes at least some of the entries of the queue based on the mask values of the bit vector. Other embodiments of the method are also described.

Embodiments of a computer readable storage medium are also described. In one embodiment, the computer readable storage medium embodies a program of machine-readable instructions, executable by a digital processor, to perform operations to facilitate queue allocation. The operations include operations to store a plurality of dispatch indicators corresponding to pairs of entries in a queue. Each dispatch indicator is indicative of the dispatch order of the corresponding pair of entries. The operations also include operations to store a bit vector comprising a plurality of mask values corresponding to the dispatch indicators of the dispatch order data structure, and to perform a queue operation on a subset of the entries in the queue. The subset excludes at least some of the entries of the queue based on the mask values of the bit vector. Other embodiments of the computer readable storage medium are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
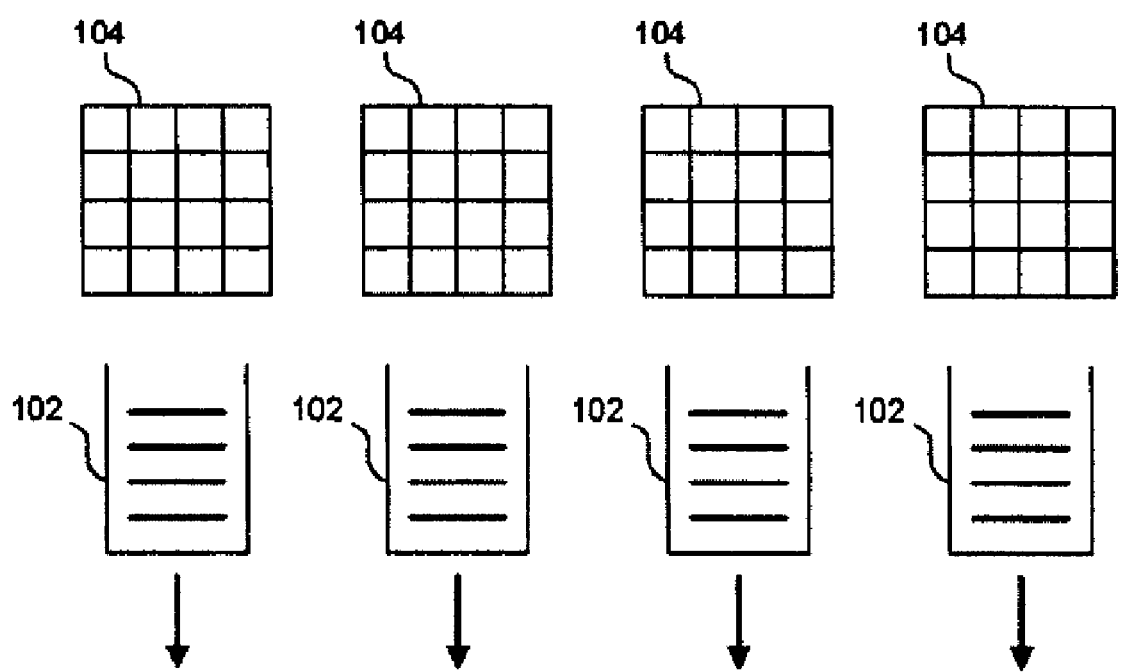
FIG. 1 depicts a schematic block diagram of one embodiment of a plurality of instruction scheduling queues with corresponding dispatch order data structures.

FIG. 1 depicts a schematic block diagram of one embodiment of a plurality of instruction scheduling queues 102 with corresponding dispatch order data structures 104. In general, the instruction scheduling queues 102 store instructions, or some representative indicators of the instructions, prior to execution. The instruction scheduling queues 102 are also referred to as issue queues. The stored instructions are referred to as entries. It should be noted that although the following description references a specific type of queue (i.e., an instruction scheduling queue), embodiments may be implemented for other types of queues.

Instead of implementing shifting and collapsing operations to continually adjust the positions of the entries in each queue 102, the dispatch order data structure 104 is kept separately from the queue. In one embodiment, each issue queue 102 is a fully-associative structure in a random access memory (RAM) device. The dispatch order data structures 104 are separate control structures to maintain the relative dispatch order, or age, of the entries in the corresponding issue queues 102. An associated instruction scheduler may be implemented as a RAM structure or, alternatively, as another type of structure.

In one embodiment, the dispatch order data structures 104 correspond to the queues 102. Each dispatch order data structure 104 stores a plurality of dispatch indicators associated with a plurality of pairs of entries of the corresponding queue 102. Each dispatch indicator indicates a dispatch order of the entries in each pair.

In one embodiment, the dispatch order data structure 104 stores a representation of at least a partial matrix with intersecting rows and columns. Each row corresponds to one of the entries of the queue, and each column corresponding to one of the entries of the queue. Hence, the intersections of the rows and columns correspond to the pairs of entries in the queue. Since the dispatch order data structure 104 stores dispatch, or age, information, and may be configured as a matrix, the dispatch order data structure 104 is also referred to as an age matrix.

Figure 2:
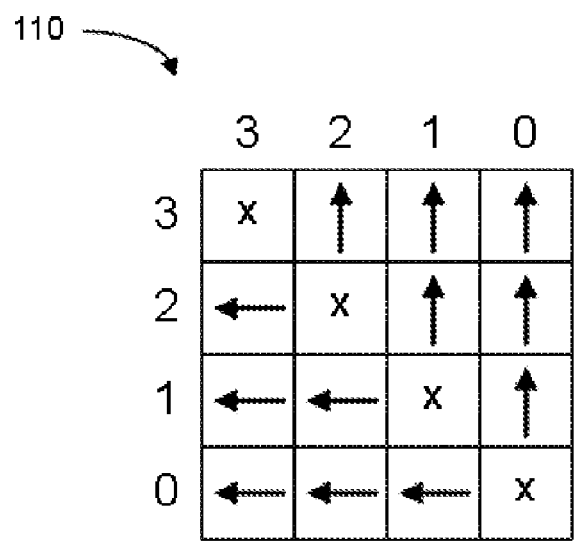
FIG. 2 depicts a schematic diagram of one embodiment of a dispatch order data structure in a matrix configuration.

FIG. 2 depicts a schematic diagram of one embodiment of a dispatch order data structure 110 in a matrix configuration. The dispatch order data structure 110 is associated with a specific issue queue 102. The dispatch order of the entries in the queue 102 depends on the relative age of each entry, or when the entry is written into the queue, compared to the other entries in the queue 102. The dispatch order data structure 110 provides a representation of the dispatch order for the corresponding issue queue 102.

The illustrated dispatch order data structure 110 has four rows, designated as rows 0-3, corresponding to entries of the issue queue 102. Similarly, the dispatch order data structure has four columns, designated as columns 0-3, corresponding to the same entries of the issue queue 102. Other embodiments of the dispatch order data structure 110 may include fewer or more rows and columns, depending on the number of entries in the corresponding issues queue 102.

The intersections between the rows and columns correspond to different pairs, or combinations, of entries in the issue queue 102. As described above, each entry of the dispatch order data structure 110 indicates a relative dispatch order, or age, of the corresponding pair of entries in the queue 102. Since there is not a relative age difference between an entry in the queue 102 and itself (i.e., adhere the row and column correspond to the same entry in the queue 102), the diagonal of the dispatch order data structure 110 is not used or masked Masked dispatch indicators are designated by an "X".

For the remaining entries, arrows are shown to indicate the relative dispatch order for the corresponding pairs of entries in the queue 102. As a matter of convention in FIG. 2, the arrow points toward the older entry, and a way from the newer entry, in the corresponding pair of entries. Hence, a left arrow indicates that the issue queue entry corresponding to the row is older than the issue queue entry corresponding to the column. In contrast, an upward arrow indicates that the issue queue entry corresponding to the column is older than the issue queue entry corresponding to the row.

For example, Entry_0 of the queue 102 is older than all of the other entries, as shown in the bottom row and the rightmost column of the dispatch order data structure 110 (i.e., all of the arrows point toward the older entry, Entry_0). In contrast, Entry_3 of the queue 102 is newer than all of the other entries, as shown in the top row and the leftmost column of the dispatch order data structure 110 (all of the arrows point away from the newer entry, Entry_3). By looking at all of the dispatch indicators of the dispatch order data structure 110, it can be seen that the dispatch order, from oldest to newest, of the corresponding issue queue 102 is: Entry_0, Entry_1, Entry_2, Entry_3.

Figure 3:
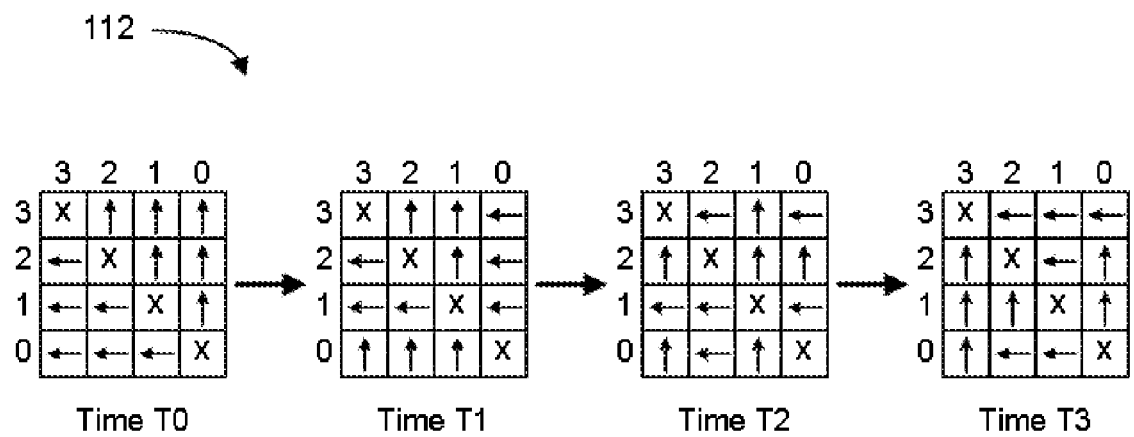
FIG. 3 depicts a schematic diagram of one embodiment of a sequence of data structure states of the dispatch order data structure shown in FIG. 2.

FIG. 3 depicts a schematic diagram of one embodiment of a sequence 112 of data structure states of the dispatch order data structure 110 shown in FIG. 2. At time T0, the dispatch order data structure 110 has the same dispatch order as shown in FIG. 2 and described above. At time T1, a new entry is written in Entry_0 of the issue queue 102. As a result, the dispatch indicators of the dispatch order data structure 110 are updated to show that Entry_0 is the newest entry in the issue queue 102. Since Entry_0 was previously the oldest entry in the issue queue 102, all of the dispatch indicators for Entry_0 are up dated.

At time T2, a new entry is written in Entry_2. As a result, the dispatch indicators of the dispatch order data structure 110 are updated to show that Entry_2 is the newest entry in the issue queue 102. Since Entry_2 was previously older than Entry_3 and Entry_0 at time T1, the corresponding dispatch indicators for the pairs Entry_2/Entry_3 and Entry_2/Entry_0 are updated, or flipped. Since Entry_2 is already marked as newer than Entry_1 at time T1, the corresponding dispatch indicators for the pair Entry_2/Entry_1 is not changed.

At time T3, a new entry is written in Entry_1. As a result, the dispatch indicators of the dispatch order data structure 110 are updated to show that Entry_1 is the newest entry in the issue queue 102. Since Entry_1 was previously the oldest entry in the issue queue 102 at time T2, all of the corresponding dispatch indicators for Entry_1 are updated, or flipped.

Figures 4, 5:
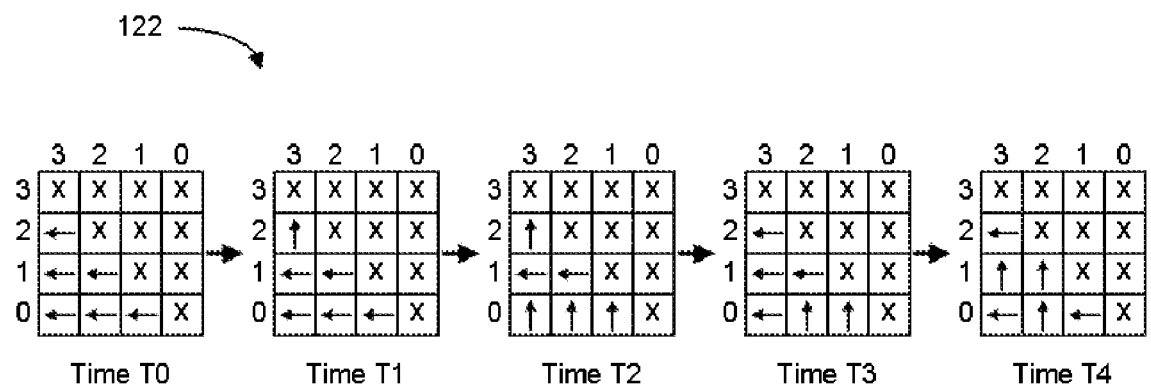
FIG. 4 depicts a schematic diagram of another embodiment of a dispatch order data structure with masked duplicate entries.
FIG. 5 depicts a schematic diagram of one embodiment of a sequence of data structure states of the dispatch order data structure shown in FIG. 4.

FIG. 4 depicts a schematic diagram of another embodiment of a dispatch order data structure 120 with masked duplicate entries. Since the dispatch indicators above and below the masked diagonal entries are duplicates, either the top or bottom half of the dispatch order data structure 120 may be masked. In the embodiment of FIG. 4, the top portion is masked. However, other embodiments may use the top portion and mask the bottom portion.

FIG. 5 depicts a schematic diagram of one embodiment of a sequence 122 of data stricture states of the dispatch order data structure 120 shown in FIG. 4. In particular, the sequence 122 shows how the dispatch indicators in the lower portion of the dispatch order data structure 120 are changed each time an entry in the corresponding queue 102 is changed. At time T1, a new entry is written in Entry_2, and the dispatch indicator for the pair Entry_2/Entry_3 is updated. At time T2, a new entry is written in Entry_0, and the dispatch indicators for all the pairs associated with Entry_0 are updated. At time T3, a new entry is written in Entry_3, and the dispatch indicators for the pairs Entry_3/Entry_0 and Entry_3/Entry_2 are t dated. At time T4, a new entry is written in Entry_1, and the dispatch indicators for all of the entries associated with Entry_1 are updated.

Figure 6:
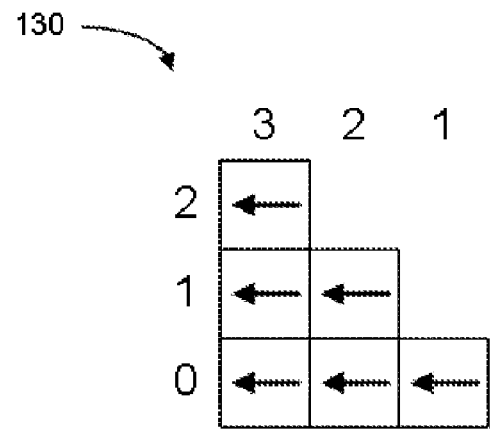
FIG. 6 depicts a schematic diagram of another embodiment of a dispatch order data structure in a partial matrix configuration.

FIG. 6 depicts a schematic diagram of another embodiment of a dispatch order data structure 130 in a partial matrix configuration. Instead of masking the duplicate and unused dispatch indicators, the dispatch order data structure 130 only stores one dispatch indicator for each pair of entries in the queue.

In this embodiment, the partial matrix configuration has fewer entries, and may be stored in less memory space, than the previously described embodiments of the dispatch order data structures 110 and 120. In particular, for an issue queue 102 with a number of entries, N, the dispatch order data structure 130 may store the same number of dispatch indicators, n, as there are pairs of entries according to the following:

$$n = C_2^N = \frac{N!}{2!(N-2)!}$$

where n designates the number of pairs of entries of the queue 102, and N designates a total number of entries in the queue 102. For example, if the queue 102 has 4 entries, then the number of pairs of entries is 6. Hence, the dispatch order data structure 130 stores six dispatch indicators, instead of 16 (i.e., a 4×4 matrix) dispatch indicators. As another example, an issue queue 102 with 16 entries has 120 unique pairs, and the corresponding dispatch order data structure 130 stores 120 dispatch indicators.

Figure 7:
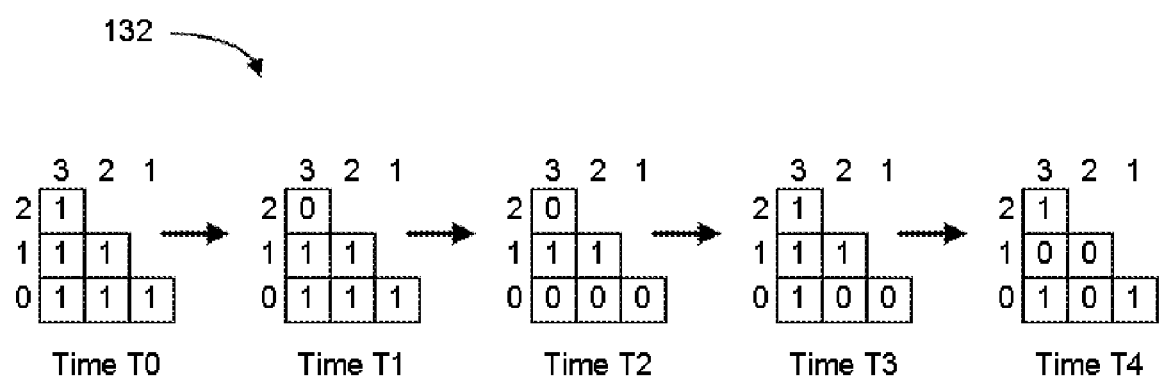
FIG. 7 depicts a schematic diagram of one embodiment of a sequence of data structure states of the dispatch order data structure shown in FIG. 6.

FIG. 7 depicts a schematic diagram of one embodiment of a sequence 132 of data structure states of the dispatch order data structure 130 shown in FIG. 6. However; instead of showing the dispatch indicators as arrows, the illustrated dispatch order data structures 130 of FIG. 7 are shown as binary values. As a matter of convention, a binary "1" corresponds to a left arrow, and a binary "0" corresponds to an toward arrow. However, other embodiments may be implemented using a different convention. Other than using binary values for a limited number of dispatch indicators, the sequence 132 of queue operations for times T0-T4 are the same as described above for FIG. 5.

Figure 8:
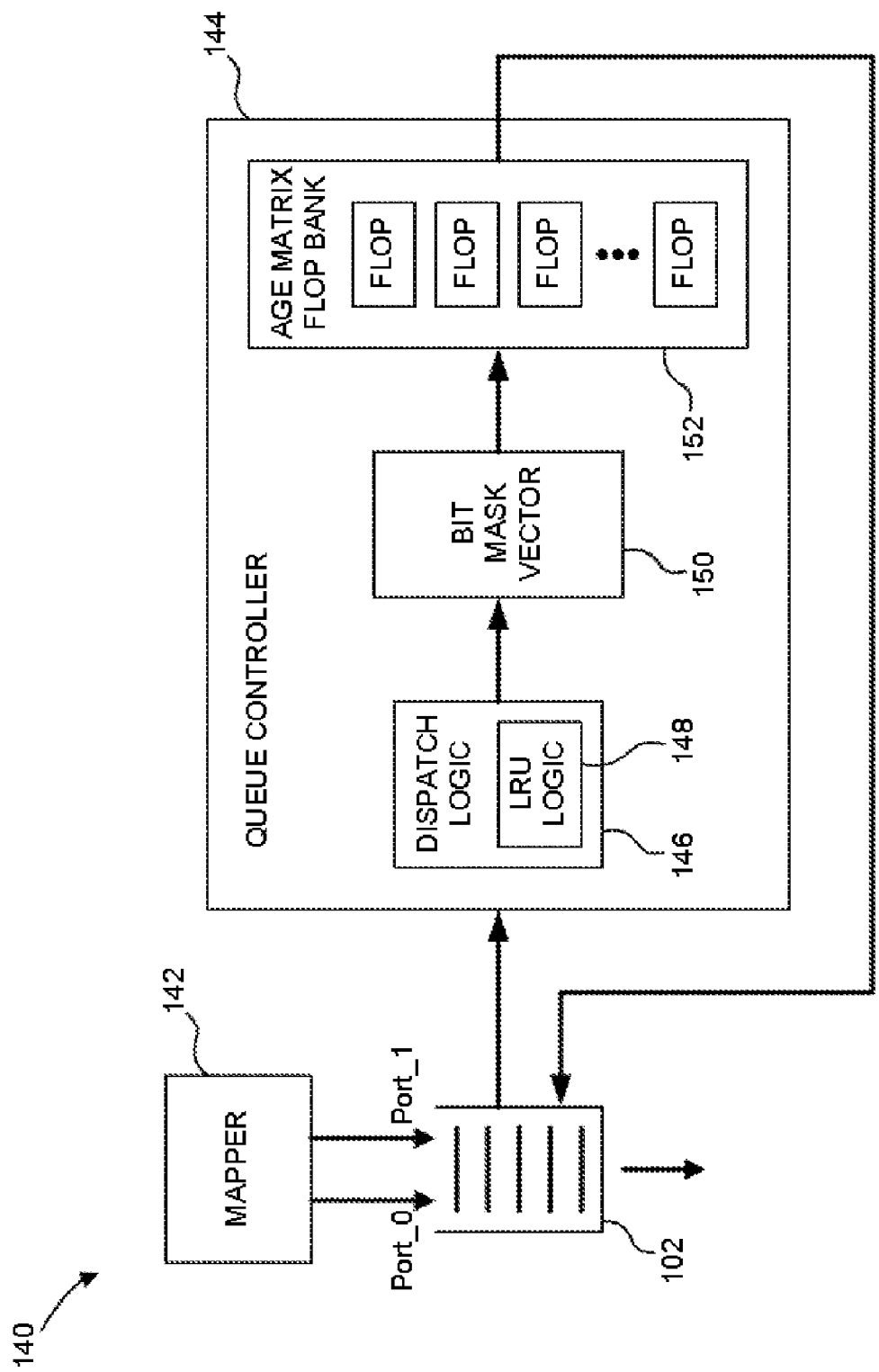
FIG. 8 depicts a schematic block diagram of one embodiment of an instruction queue scheduler which uses a dispatch order data structure.

FIG. 8 depicts a schematic block diagram of one embodiment of an instruction queue scheduler 140 which uses a dispatch order data structure 104 such as one of the dispatch order data structures 110, 120, or 130. In one embodiment, the scheduler 140 is implemented in a processor (not shown). The processor may be implemented in a reduced instruction set computer (RISC) design. Additionally, the processor may implement a design based on the MIPS instruction set architecture (ISA). However; alternative embodiments of the processor may implement other instruction set architectures. It should also be noted that other embodiments of the scheduler 140 may include fewer or more components than are shown in FIG. 8.

In conjunction with the scheduler 140, the processor also may include execution units (not shown) such as an arithmetic logic unit (ALU), a floating point unit (FPU), a load/store unit (SU), and a memory management unit (MMU). In one embodiment, each of these execution units is coupled to the scheduler 140, which schedules instructions for execution by one of the execution units. Once an instruction is scheduled for execution, the instruction may be sent to the corresponding execution unit where it is stored in an instruction queue 102.

The illustrated scheduler 140 includes a queue 102, a mapper 142, and a queue controller 144. The mapper 142 is configured to issue one or more queue operations to insert new entries in the queue 102. In one embodiment, the mapper 142 dispatches up to two instructions per cycle to each issue queue 102. The queue controller 144 also interfaces with the queue 102 to update a dispatch order data structure 104 in response to a queue operation to insert a new entry in the queue 102.

In order to receive two instructions per cycle, each issue queue 102 haste write points, which are designated as Port_0 and Port_1. Alternatively, the mapper 142 may dispatch a singe instruction on one of the write ports. In other embodiments the issue queue 102 may have one or more write ports. If multiple instructions are dispatched at the same time to multiple write ports then the write ports may have a designated order to indicate the relative dispatch order of the instructions which are issued together. For example, an instruction issued on Port_0 may be designated a older than an instruction issued in the same cycle on Port_1. In one embodiment, write addresses are generated internally in each issue queue 102.

The queue controller 144 keeps track of the dispatch order of the entries in the issue queue 102 to determine which entries can be over written (or evicted). In order to track the dispatch order of the entries in the queue 102, the queue controller 144 includes dispatch logic 146 with least recently used (LRU) logic 148. The queue controller 144 also includes a bit mask vector 150 and an age matrix flop bank 152. In one embodiment, the flop bank 152 includes a plurality of flip-flops. Each flip-flop stores a bit value indicative of the dispatch order of the entries of a corresponding pair of entries. In other words, each flip-flop corresponds to a dispatch indicator, and the flop bank 152 implements the dispatch order data structure 104. The bit value of each flip-flop is a binary bit value. In one embodiment, a logical high value of the binary bit value indicates one dispatch order of the pair of entries (e.g., the corresponding row is older than the corresponding column), and a logical low value of the binary bit value to indicate a reverse dispatch order of the pair of entries (e.g., the corresponding column is older than the corresponding grow). When a dispatch indicator is updated in response to a new instruction written to the queue 102, the dispatch logic 146 is configured to potentially flip the binary bit value for the corresponding dispatch indicators. As described above, the number of flip-flops in the flop bank 152 may be determined by the number of pairs (e.g., combinations) of entries in the queue 102.

In order to determine which entries may be overwritten in the queue 102, the dispatch logic 146 includes least recently used (LRU) logic 148 to implement a LRU replacement strategy. In one embodiment, the LRU replacement strategy is based at least in part, on the dispatch indicators of the corresponding dispatch order data structure 104 implemented by the flop bank 152. As examples, the LRU logic 148 may implement a true LRU replacement strategy or other strategies like pseudo LRU or random replacement strategies. In a true LRU replacement strategy, the LRU entries in the queue 102 are replaced. The LRU entries are designated by LRU replacement addresses. However, generating the LRU replacement addresses, which is a serial operation, can be logically complex. A pseudo LRU replacement strategy approximates the true LRU replacement strategy using a less complicated implementation.

When the mapper dispatches a new entry to the queue 102 as a part of a queue operation, the queue 102 interfaces with the queue controller 144 to determine which existing entry to discard to make room for the newly dispatched entry. In some embodiments the dispatch logic 146 uses the age matrix flop bank 152 to determine which entry to replace based on the absolute dispatch order of the entries in the queue 102. However, in other embodiments, it may be useful to identify an entry to discard from among a subset of the entries in the queue 102.

As one example, some entries in the queue 102 may be associated with a replay operation, so it may be useful to maintain the corresponding entries in the queue 102, regardless of the dispatch order of the entries. Thus the entry to be discarded may be selected from a subset that excludes the entries associated with the replay operation.

As another example, it may be useful to maintain certain entries in the queue 102 in order to prevent a hazard event such as a structural, data, or control hazard. Thus the entry to be issued may be selected from a subset that excludes the entries that, if issued, would potentially create a hazard event.

As another example, it may be useful to prioritize entries of the queue 102 that are related to a particular thread of a multi-threaded processing system. Thus, the entries to be masked out may be selected from a subset that excludes entries related to the identified thread. In this way, the entries corresponding to the identified thread are given priority, because the entries associated with the thread are not masked out.

As another example, it may be useful to preserve entries of the queue 102 that are not on the speculative execution path and discard (or flush) the entries that are on the speculative path. The entries to be discarded may be masked out, thereby restricting the selection to just the non-speculative execution path. By enforcing this restriction, higher performance may be achieved while simultaneously reducing power. In one embodiment, multiple entries may atomically be chosen for discarding. However, in other embodiments, it may be useful to identify an entry to discard from among a subset of entries in the queue 102.

In order to identify a subset of the entries in the queue 102, the queue controller 144 may use one or more bit mask vectors 150. In one embodiment, each bit mask vector 150 is used to mask out one or more dispatch indicators of a dispatch order data structure 104 such as the age matrix flop bank 152. In other words, each bit mask vector 150 (orbit vector) is configured to store a plurality of mask values corresponding to the dispatch indicators of the dispatch order data structure 104. Thus, the queue controller 144 can exclude at least some of the entries of the queue 102 from a queue operation based on the mask values of the bit vector 150. For example, instead of selecting the absolute oldest entry of the queue 102 to be discarded, the dispatch logic 146 may select the oldest entry of the subset of entries that are not masked by the bit mask vector 150. In an alternative embodiment, the bit mask vector 150 is used to identify entries that may be discarded in a dispatch operation, rather than entries to be maintained in the queue 102 (i.e., excluded from potentially discarding) in a dispatch operation.

Figure 9:
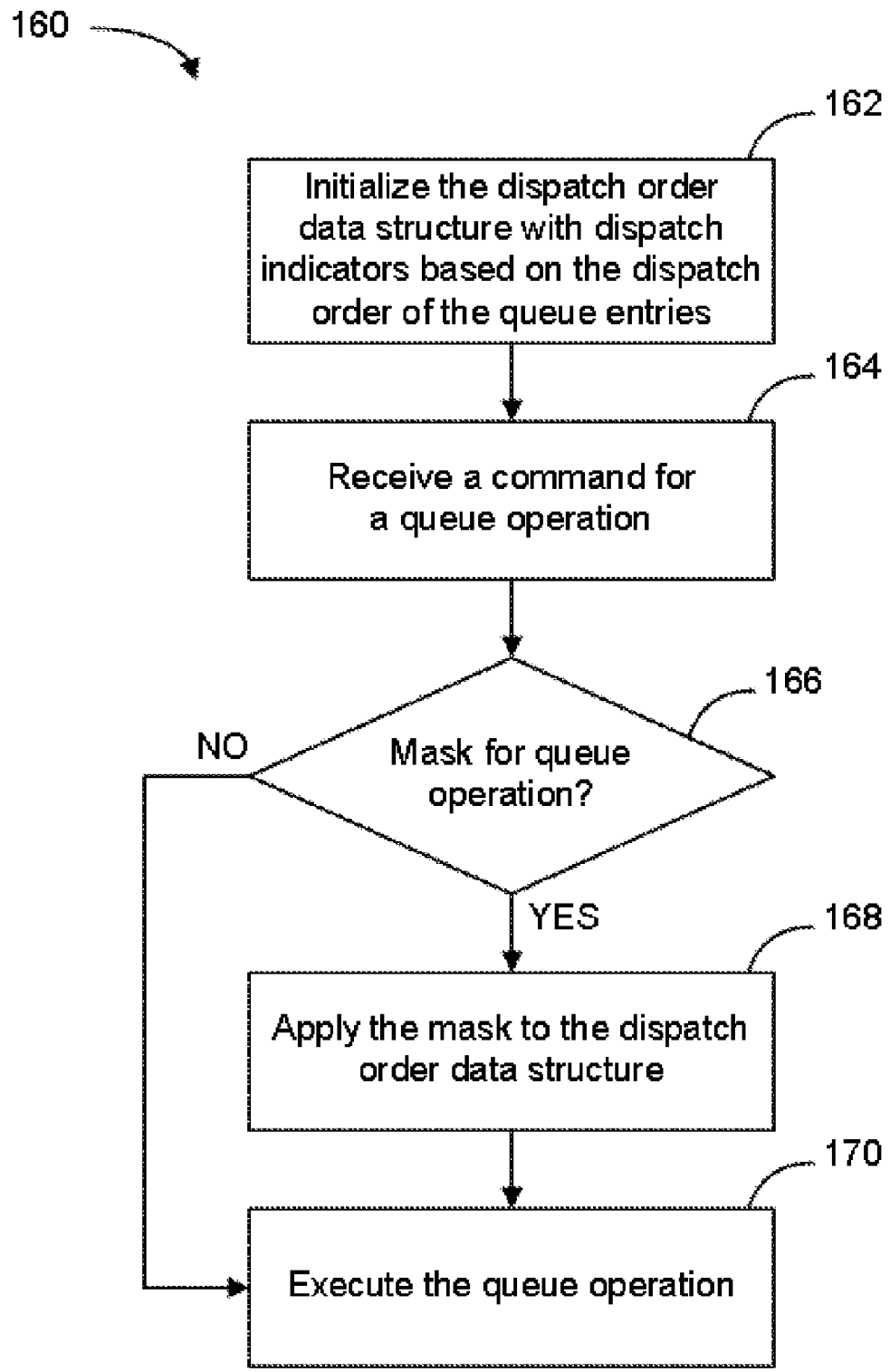
FIG. 9 depicts a schematic flowchart diagram of one embodiment of a queue operation method for use with the instruction queue scheduler of FIG. 8.

FIG. 9 depicts a schematic flowchart diagram of one embodiment of a queue operation method 160 for use with the instruction queue scheduler 140 of FIG. 8. Although the tracking method 160 is described with reference to the instruction queue scheduler 140 of FIG. 8, other embodiments may be implemented in conjunction with other schedulers.

In the illustrated queue operation method 160, the queue controller 144 initializes 162 the dispatch order data structure 104. As described above, the queue controller 144 may initialize the dispatch order data stricture 104 with a plurality of dispatch indicators based on the dispatch order of the entries in the queue 102. In this way, the dispatch order data structure 104 maintains an absolute dispatch order for the queue 102 to indicate the order in which the entries are written into the queue 102. Although some embodiments are described as using a particular type of dispatch order data structure 104 such as the age matrix, other embodiments may use other implementations of the dispatch order data structure.

The illustrated queue operation method 160 continues as the queue 102 receives 164 a command for a queue operation such as an instruction issue operation. As explained above, the queue controller 144 selects an existing entry of the queue 102 to be discarded from all of the entries in the queue 102 or from a subset of the entries in the queue 102. In order to identify a subset of the entries in the queue 102, the queue controller 144 determines 166 if there is a bit mask vector 150 to use with the received queue operation. If there is a bit mask vector 150, then the dispatch logic 146 applies 168 the bit mask vector 150 to the dispatch order data structure 104 before executing 170 the queue operation. In this situation, the candidate entries which may be discarded from the queue 102 is limited to some subset of the entries in the queue 102. Otherwise, if there is not an applicable bit mask vector 150, then the dispatch logic 146 may directly execute 170 the queue operation. In this situation, the candidate entries which may be discarded from the queue 102 is not limited to a subset of the entries in the queue 102. After executing 170 the queue operation, the depicted queue operation method 160 ends.

It should be noted that embodiments of the methods, operations, functions, and or logic may be implemented in software, firmware, hardware, or some combination thereof. Additionally, some embodiments of the methods, operations functions and/or logic may be implemented using a hardware or software representation of one or more algorithms related to the operations described above. To the degree that an embodiment may be implemented in software, the methods, operations, functions and/or logic are stored on a computer-readable medium and accessible by a computer processor.

As one example, an embodiment may be implemented as a computer readable storage medium embodying a pro gram of machine-readable instructions executable by a digital processor, to perform operations to facilitate queue allocation. The operations may include operations to store a plurality of dispatch indicators corresponding to pairs of entries in a queue. Each dispatch indicator is indicative of the dispatch order of the corresponding pair of entries. The operations also include operations to store a bit vector comprising a plurality of mask values corresponding to the dispatch indicators of the dispatch order data structure, and to perform a queue operation on a subset of the entries in the queue. The subset excludes at least some of the entries of the queue based on the mask values of the bit vector. Other embodiments of the computer readable storage medium may facilitate fewer or more operations.

Embodiments of the invention also may involve a number of functions to be performed by a computer processor such as a central processing unit (CPU), a graphics processing unit (GPU), or a microprocessor. The microprocessor may be a specialized or dedicated microprocessor that is configured to perform particular tasks by executing machine-readable software code that defines the particular tasks. The microprocessor also may be configured to operate and communicate with other devices such as direct memory access modules, memory storage devices, Internet related hardware, and other devices that relate to the transmission of data. The software code may be configured using software formats such as Java, C++, XML (Extensible Mark-up Language) and other languages that may be used to define functions that relate to operations of devices required to carry out the functional operations related described herein. The code may be written in different forms and styles, many of which are known to those skilled in the art. Different code formats, code configurations styles and forms of software programs and other means of configuring code to define the operations of a microprocessor may be implemented.

Within the different types of computers, such as computer servers, that utilize the invention, there exist different types of memory devices for storing and retrieving information while performing some or all of the functions described herein. In some embodiments, the memory/storage device where data is stored may be a separate device that is external to the processor, or may be configured in a monolithic device, where the memory or storage device is located on the same integrated circuit, such as components connected on a singe substrate. Cache memory devices are often included in computers for use by the CPU or GPU as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform certain functions when executed by the central processing unit. These memory devices may be configured as random access memory (RAM), static random access memory (SRAM), dynamic ran dm access memory (DRAM), flash memory, and other memory storage devices that may be accessed by a central processing unit to store and retrieve information. Embodiments may be implemented with various memory and storage devices as well as any commonly used protocol for storing and retrieving information to and from these memory devices respectively.

Although the operations of the method(s) herein are show and described in a particular order, the order of the operations of each method may be altered so that certain operations may be performed in an inverse order or so that certain operations may be performed at least in part, concurrently with other operations. In another embodiment, instructions or sub-operations of distinct operations may be implemented in an intermittent and/or alternating manner.

Although specific embodiments of the invention have been described and illustrated the invention is not to be limited to the specific forms or arrangements of parts so described and illustrated. The scope of the invention is to be defined by the claims appended hereto and their equivalents.

What is claimed is:

1. An apparatus comprising:
a queue to store a plurality of entries;
a dispatch order structure corresponding to the queue, the dispatch order structure comprising indicator entries to store a plurality of indicators associated with a plurality of different pairs of entries of the queue to indicate a dispatch order of the entries, wherein at least one of the indicators indicates the relative age for the corresponding different pairs of entries in the queue such that respective indicators of the plurality of indicators of the dispatch order structure have either a first value or a second value, the first value indicating an entry is older than another entry and the second value indicating the entry is younger than the another entry, wherein the dispatch order structure comprises a representation of a partial matrix and masked duplicate entries, the partial matrix to store a portion of a matrix of rows and columns and to mask duplicate entries of the matrix; and
a controller to interface with the queue and the dispatch order structure, the controller to update the dispatch order structure in response to an operation to insert a new entry in the queue.

2. The apparatus according to claim 1, in which at least one of the rows corresponds to one of the entries of the queue and at least one of the columns corresponds to one of the entries of the queue, and the intersections of the rows and columns corresponds to the pairs of entries in the queue.

3. The apparatus according to claim 1, in which the dispatch order structure comprises a flop bank with a plurality of flip-flops, at least one of the flip-flops to store a bit value indicative of the dispatch order of the entries of a corresponding pair of entries.

4. The apparatus according to claim 3, the bit value comprising a binary bit value, a logical high value of the binary bit value to indicate the dispatch order of the pair of entries, and a logical low value of the binary bit value to indicate a reverse dispatch order of the pair of entries.

5. The apparatus according to claim 4, in which the controller comprises dispatch logic to interface with the dispatch order structure, the dispatch logic to flip the binary bit value for at least one of the indicators in response to the operation to insert the new entry in the queue.

6. The apparatus according to claim 3, in which the flop bank comprises a number of flip-flops, n, according to the following:

$$n = C_2^N = \frac{N!}{2!(N-2)!}$$

where n designates a number of pairs of entries of the queue, and N designates a total number of entries in the queue.

7. The apparatus according to claim 1, in which the queue and the dispatch order structure are situated in a random access memory (RAM) device, wherein the queue comprises a fully associative RAM structure and the dispatch order structure comprises a control structure separate from the fully associative RAM structure.

8. The apparatus according to claim 1, in which the controller comprises address logic to facilitate translation of an address corresponding to the operation.

9. The apparatus according to claim 1, in which the controller further comprising logic, the logic to indicate available entries in the queue.

10. The apparatus according to claim 9, in which the logic is configured to provide an indication that the queue is full beyond a threshold.

11. The apparatus according to claim 10, the threshold corresponding to a factor of the following factors, including a number of used entries in the queue, a number of unused entries in the queue, a percentage of used entries in the queue, and a percentage of unused entries in the queue.

12. The apparatus according to claim 10, further comprising a mapper coupled to the queue, the mapper to dispatch the operation to insert the new entry in the queue, the logic further configured to communicate the indication to the mapper.

13. The apparatus according to claim 1, in which the controller comprises least recently used (LRU) logic, the LRU logic to implement a replacement strategy for the queue based at least in part upon the dispatch order structure.

14. The apparatus according to claim 13, in which the replacement strategy comprises a true LRU replacement strategy to replace a LRU entry of the queue with the new entry.

15. The apparatus according to claim 13, in which the replacement strategy comprises a pseudo LRU replacement strategy to replace an older entry of the queue with the new entry.

16. A method comprising:
storing a plurality of entries in a queue;
identifying different pairs of entries in the queue;
storing a plurality of indicators corresponding to the different pairs of entries in a dispatch order structure, in which the dispatch order structure comprises a partial matrix and masked duplicate entries such that the partial matrix stores a portion of a matrix of rows and columns and duplicate entries are masked, at least one of the plurality of indicators indicative of a dispatch order of the corresponding different pairs of entries, wherein an indicator indicates the relative age for the corresponding different pairs of entries in the queue such that respective indicators of the plurality of indicators have either a first value or a second value, the first value indicating an entry is older than another entry and the second value indicating the entry is younger than the another entry; and dispatching an entry from the queue according to at least one of the plurality of indicators associated with the entry.

17. The method according to claim 16, in which at least one of the rows corresponds to one of the entries of the queue and at least one of the columns corresponds to one of the entries of the queue, and the intersections of the rows and columns correspond to the pairs of entries in the queue.

18. The method according to claim 16, in which the storing the plurality of indicators comprises storing the indicators in a plurality of flip-flops of a flop bank, at least one of the flip-flops comprising a bit value indicative of the dispatch order of a corresponding pair of entries.

19. The method according to claim 18, further comprising flipping the bit value from a first logical state to a second logical state in response to the dispatched entry.

20. The method according to claim 16, further comprising generating a signal indicative of available entries in the queue.

21. The method according to claim 20, in which the signal comprises an indication that the queue is full beyond a threshold, the method further comprising communicating the indication to a mapper configured to insert new entries in the queue.

22. The method according to claim 16, further comprising implementing a true least recently used (LRU) replacement strategy for the queue based at least in part upon at least some of the indicators.

23. The method according to claim 16, further comprising implementing a pseudo least recently used (LRU) replacement strategy for the queue based at least in part upon at least some of the indicators.

24. A non-transitory computer readable storage medium embodying a program of machine-readable instructions, executable by a digital processor, to perform operations, the operations comprising:

storing a plurality of entries in a queue;

identifying different pairs of entries in the queue;

storing a plurality of indicators corresponding to the different pairs of entries in a dispatch order structure, in which the dispatch order structure comprises a partial matrix and masked duplicate entries such that the partial matrix stores a portion of a matrix of rows and columns and duplicate entries are masked, at least one of the plurality of indicators indicative of a dispatch order of the corresponding different pairs of entries, wherein an indicator indicates the relative age for the corresponding different pairs of entries in the queue such that respective indicators of the plurality of have either a first value or a second value, the first value indicating an entry is older than another entry and the second value indicating the entry is younger than the another entry; and dispatching an entry from the queue according to at least one of the plurality of indicators associated with the entry.

25. The computer readable storage medium according to claim 24, in which at least one of the rows corresponds to one of the entries of the queue and at least one of the columns corresponds to one of the entries of the queue, and the intersections of the rows and columns correspond to the pairs of entries in the queue.

26. The computer readable storage medium according to claim 24, in which the dispatching the entry comprises flipping a bit value of at least one of the indicators from a first logical state to a second logical state in response to the dispatched entry.

27. The computer readable storage medium according to claim 24, in which the operations further comprise generating a signal indicative of available entries in the queue.

28. The computer readable storage medium according to claim 24, in which the operations further comprise generating an indication that the queue is full beyond a threshold.

29. The computer readable storage medium according to claim 28, in which the operations further comprise communicating the indication to a mapper configured to insert new entries in the queue.

30. The computer readable storage medium according to claim 24, in which the operations further comprise implementing a true least recently used (LRU) replacement strategy for the queue based at least in part upon at least some of the indicators.

31. The computer readable storage medium according to claim 24, in which the operations further comprise implementing a pseudo least recently used (LRU) replacement strategy for the queue based at least in part upon at least some of the indicators.

32. A non-transitory computer readable storage medium embodying a program of machine-readable instructions, executable by a digital processor, to perform operations to manage a dispatch order of a plurality of entries of a queue, the operations comprising:

writing an entry in the queue;

assigning a line of a matrix to the entry, the line intersecting with another line of the matrix associated with another entry in the queue; and assigning a bit value to an indicator at the intersection of the lines of the matrix to indicate a relative age of a corresponding pair of entries in the queue such that respective indicators of the plurality of indicators have either a first value or a second value, the first value indicating an entry is older than another entry and the second value indicating the entry is younger than the another entry, wherein the matrix comprises a partial matrix and masked duplicate entries, the partial matrix stores a portion of the matrix and duplicate entries of the matrix are masked.

33. The computer readable storage medium according to claim 32, in which the operations further comprise implementing a replacement strategy for the queue based at least in part upon the indicator for the corresponding entries in the queue.

\* \* \* \* \*

UNITED STATES PATENT AND TRADEMARK OFFICE
CERTIFICATE OF CORRECTION

PATENT NO. : 8,285,974 B2  
APPLICATION NO. : 11/830727  
DATED : October 9, 2012  
INVENTOR(S) : Singh et al.

Page 1 of 1

It is certified that error appears in the above-identified patent and that said Letters Patent is hereby corrected as shown below:

Title Page, Item (54) and in the Specification, Column 1, line 1
Please replace "QUEUE ENTRIES" with --QUEUE--.

In the Claims:
Column 9
Line 60, please replace "corresponds" with --correspond--.

Column 10
Line 31, please replace "comprising" with --comprises--.

Column 11
Line 56, please replace "plurality of have" with --plurality of indicators have--.

Signed and Sealed this
Thirteenth Day of August, 2013

Teresa Stanek Rea
*Acting Director of the United States Patent and Trademark Office*